March 8, 1955 R. B. ESSELMAN ET AL 2,703,519
GRID TYPE SEPARATOR FOR USE ON VEHICLES
Filed March 5, 1951
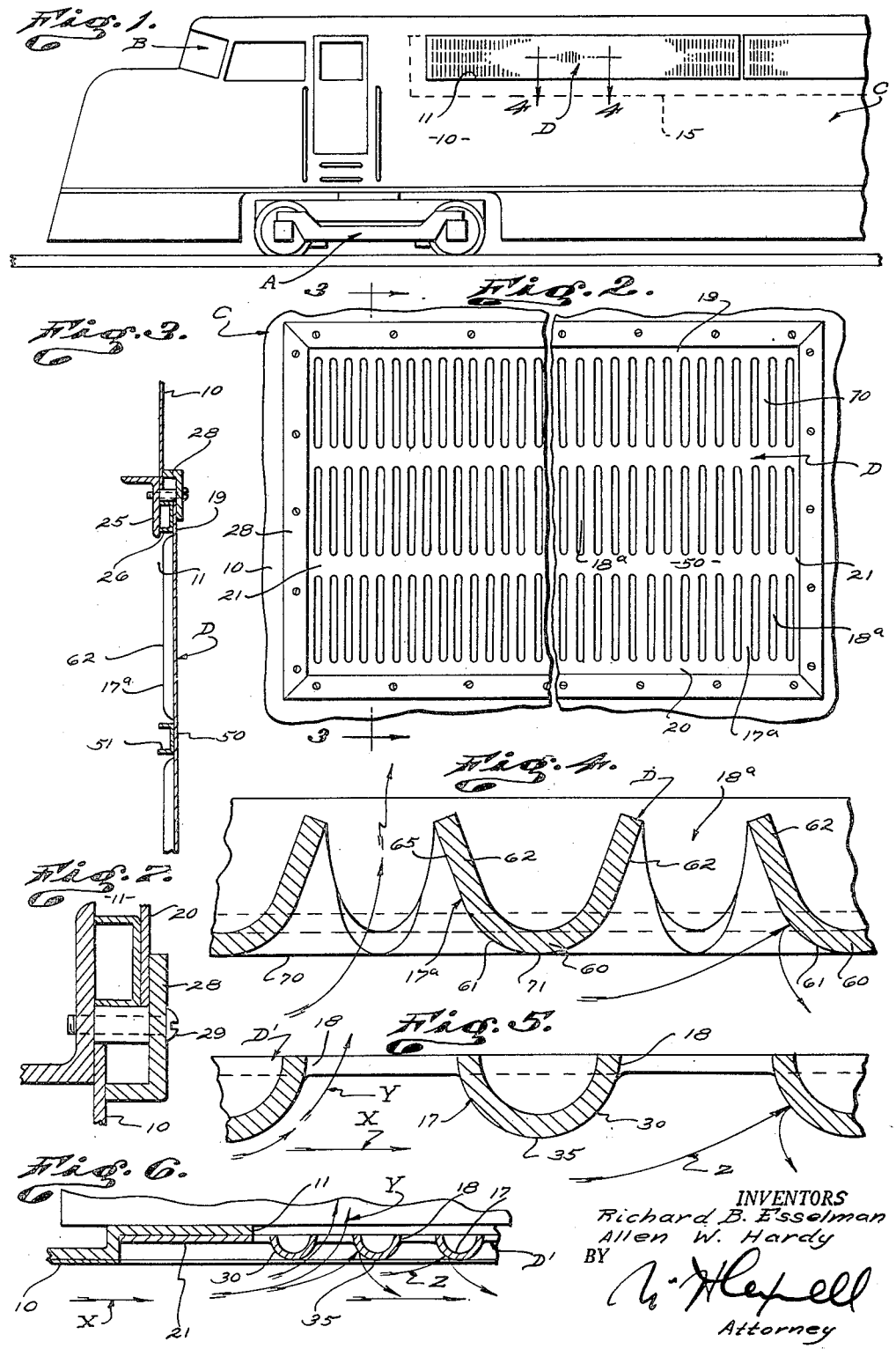
INVENTORS
Richard B. Esselman
Allen W. Hardy
BY
Attorney _United States Patent Office_

2,703,519
Patented Mar. 8, 1955

2,703,519

GRID TYPE SEPARATOR FOR USE ON VEHICLES

Richard B. Esselman, Manhattan Beach, and Allen W. Hardy, Los Angeles, Calif., assignors to Farr Company, Los Angeles, Calif., a corporation of California Application March 5, 1951, Serial No. 213,988

8 Claims. (Cl. 98—18)

This invention is concerned with a grid type separator for use on or as a part of a vehicle, or the like, to separate air and foreign matter, such, for example, as sand, dust, snow, etc., and it is a general object of the invention to provide a simple, practical, highly effective structure of this character.

This application is filed as a continuation in part of our co-pending application Serial No. 114,228, now abandoned, entitled "Separator for Use on Vehicles to Separate Air From Foreign Matter," filed September 6, 1949.

Modern vehicles operate at high speeds and in some situations it is required or desirable that such vehicles take in air as they travel, and it is important that the air thus taken in be clean or free from foreign matter such as snow, sand, dust, etc. As an example, we will refer to a locomotive, which may operate at high speeds, and which is propelled by internal combustion, turbine or jet type engines requiring intake of a substantial volume of clean air. Further, modern locomotives of the type mentioned usually include radiators cooled by the circulation of air and they also include considerable electrical equipment embodying grids and various elements or units that are advantageously cooled by air. In such cases conventional air filters provided to handle the incoming air are reasonably effective in handling dust and sand, but snow and rain enter such structures and present a serious problem.

The present invention provides a vehicle having a case or skin with an outer surface over which air flows as the vehicle advances, and in such skin there is an air inlet opening such as may admit air to an air filter or other equipment provided in the vehicle. The invention provides a panel at the air inlet opening which occurs in the skin of the vehicle and such panel is characterized by parallel vertical slots or openings which leave or define ribs which extend vertically and which are parallel with each other. Each rib has an outer portion or front with an exposed face that is preferably convex in form and it preferably has inwardly projecting lip portions that project inwardly from the edges of the front. In a preferred embodiment the front extends through about 140° and the lips are flat and angularly related to each other so that the lips of adjacent ribs converge and form or define an inwardly convergent nozzle-like air passage between the ribs. The ribs are preferably uniformly spaced horizontally or lengthwise of the vehicle and the parts are proportioned so that the mean width or horizontal extent of each opening in the panel is about equal to or slightly less than the width or horizontal extent of the front of each rib. In one form of the invention the ribs project forward or outward from the plane of the panel, whereas in another form they are rearward of said plane. In the preferred form the panel is fixed on or at the side or skin of the vehicle to be substantially flush therewith.

A general object of the present invention is to provide a separator construction in the body of a vehicle, such as a locomotive, or the like, serving to effectively pass air without appreciable pressure differential at the two sides of the structure, while at the same time excluding foreign matter such as sand, dust, rain, snow, etc. The separator employed in carrying out the present invention provides ample openings through which air may flow or be drawn, and curved surfaces over or around which air readily and smoothly flows in reaching the openings. Foreign matter initially contained in the air tends to continue in its course past the front or face of the separator and as it is drawn into or toward the separator by the flow of air it impinges upon the surface presented by the separator and is deflected outwardly or away from the vehicle.

Another object of the invention is to provide a separator panel of the general character referred to which may, in practice, be formed of a single body or sheet of material to be free of joints, or other such structural complications, and which is trim and rigid so that it maintains its shape under severe working conditions.

It is another object of the invention to provide a separator panel of the general character referred to characterized by spaced parallel vertically extending ribs each of which has a front which is substantially semi-circular in cross-section with its convex side outward so that as the vehicle advances foreign matter strikes the convex sides of the ribs to be deflected outward or away from the vehicle.

Another object of the invention is to provide a grid construction of the general character referred to which is effective in directing air that is passed by the grid so that it flows in a body or stream and in a direction normal to the plane of the grid.

The various objects and features of our invention will be fully understood from the following detailed description of typical preferred forms of the invention, throughout which description reference is made to the accompanying drawings, in which:

Fig. 1 is a side elevation of a vehicle in the form of a locomotive, showing the body of the vehicle incorporating the present invention. Fig. 2 is an enlarged view of the portion of the vehicle body at which the structure of the present invention occurs. Fig. 3 is an enlarged sectional view taken on line 3—3 on Fig. 2. Fig. 4 is an enlarged plan section taken as indicated by line 4—4 on Fig. 1. Fig. 5 is a sectional view similar to Fig. 4 showing another form of construction. Fig. 6 is a view illustrating a mounting of the panel shown in Fig. 5, and Fig. 7 is an enlarged view of a portion of the structure shown in Fig. 3.

The separator of the invention is useful in a wide range of situations or where there is relative movement between a body of air and the separator such as occurs where the separator is on a vehicle. It is to be understood that the separator can be used in passing air to various units or devices or for various purposes, as, for instance, to engines of various forms or types, to air conditioning apparatus, to electrical equipment, etc.

We have shown the present invention applied to a vehicle in the form of a locomotive of the type employing internal combustion engines as prime movers. The particular locomotive illustrated involves a truck A supporting a body having a cab portion B and an engine carrying part C. In accordance with conventional construction the body of the vehicle has an outer shell or casing which will be referred to as a skin 10 and at the sides of the engine-carrying portion C the skin is flat and vertically disposed forming what may be termed the sides of the vehicle. In the case illustrated the flat vertically disposed portions of the skin occurring at the sides of the vehicle are provided with one or more air inlet openings 11 and each such opening is equipped with a separator panel D provided by the present invention.

The present invention is primarily concerned with the construction of the vehicle occurring at the air inlet openings and it is not concerned with or limited to features of construction such as may occur within the body of the vehicle. In the particular case illustrated air filters 15 are indicated as occurring in the body immediately inside the air inlet openings and it is to be understood that air from such equipment may be handled in the vehicle in any suitable manner.

The separator panel D provided by the present invention may, in practice, vary widely in form and construction. However, it is preferably a single sheet or plate of material such as sheet metal, and it is characterized by marginal portions and a plurality of spaced vertically disposed ribs separated by air passages.

In the case illustrated in Figs. 1, 2, 3 and 7 of the drawings the panel is rectangular in form and has marginal portions extending continuously around it so that there are upper and lower margins 19 and 20, respectively, and end margins 21. The upper and lower margins 19 and 20 are parallel and horizontally disposed while the end margins 21 are parallel and vertically disposed, extending between the ends of margins 19 and 20.

In this case the margins of the panel are suitably secured to or in the body of the vehicle. We show the body of the vehicle provided with a reinforcement or frame at or around the opening 11. Stiffeners, in the form of channel irons 26, are fixed to the inner sides of the margins and seat on the frame. If desired edge flanges may be provided on the margins of the panel in place of or in addition to the stiffeners. Retainers or clamps 28 are secured to the frame by screw fasteners and bear on the frame or body and overlap the panel so the frame is clamped tightly in place.

In the form of the present invention shown in Fig. 5 the air openings or passages 18 provided in the panel D' are straight, vertically disposed slot-like openings cut or otherwise formed in the sheet of the panel so that they extend straight and parallel with each other between the upper and lower margins of the panel. The ribs 17 which are left between or which separate the openings 18 are straight vertically disposed ribs extending between the upper and lower margins. The several ribs occurring in the panel may be of equal length and width and they may be equally spaced apart longitudinally of the vehicle, in which case the air passages 18 are of equal width.

In this form of the invention the ribs 17 project outward of or from the plane of the panel, and each rib is so shaped or formed as to have an outer convex face 30. In the case illustrated the outer face 30 of each rib is curved about a center lying in the plane of the panel, with the result that the rib is substantially semi-circular in cross section or plan configuration.

When employing the structure just described considerable variation in action can be gained by varying the relationship of the various parts or elements. For instance, marked variation in action can be obtained by varying the width of the air passages 18 relative to the width of the ribs 17. By relating these parts so that the air passages 18 are substantially equal in width to the ribs 17 and by forming the ribs so that they project outwardly from the plane of the panel and are substantially semi-circular in cross section, we gain a structure which, under operating conditions, effectively checks the entrance of foreign matter while at the same time allowing free passage of air through the air passages 18, all without any appreciable pressure differential occurring between the two sides of the panel.

The general action of the structure is illustrated in Fig. 5 where the arrow X indicates the direction in which air bearing foreign matter may flow along or parallel with the surface of the skin 10 of the vehicle to finally reach or come opposite the separator panel, at which point the air smoothly and readily flows around or over the faces 30 and finally inwardly through the air passages, as indicated by the arrow Y, while the foreign matter, being of greater mass, tends to continue in the direction of arrow X. Foreign matter deflected somewhat inward by the flow of air may take a course such as is indicated by arrow Z to finally impinge upon the convex surfaces of the ribs to be deflected outwardly thereby.

In a typical installation of the panel D' above described and shown in Figs. 5 and 6, it may be mounted so that it is indented or recessed somewhat relative to the skin 10, for instance, it may be so mounted as to locate the outermost parts or crests 35 of the ribs 17 in a plane substantially flush with the skin 10, in which case the plane of the panel or of the margins of the panel is somewhat inward of the skin 10. Such a recessing or indenting of the separator panel is illustrated in Fig. 6 of the drawings where this relationship of parts is shown as being effected through suitable shaping of the frame that supports the panel.

In the form of the invention illustrated in Figs. 1, 2, 3, 4 and 7 of the drawings the vertical air passages 18ª are so formed in the panel D as to leave ribs 17ª. In the particular case illustrated the passages and, consequently, the ribs do not extend continuously from between the upper and lower margins of the panel but, rather, are interrupted by imperforate panel portions 50 which, in effect, divide the rib portions of the panel and establish the panel with several series of ribs located one above the other and extending horizontally as clearly shown in Fig. 2 of the drawings. This construction is generally desirable in the case of a large panel and when it is employed the portions 50 of the panel separating the series of ribs may be reinforced by stiffening members or ribs 51 located at the inner side of the panel, as shown in Fig. 3 of the drawings.

In the form of the invention now being described, and which is best shown in Fig. 4 of the drawings, each rib is formed or shaped so that it has a front portion 60 presenting a convex front face 61 and lips 62 which adjoin the edges of the front portion and project rearwardly therefrom. In practice the arcuate extent of the front portion of each rib may vary, depending upon conditions to be met. For example, it may be such as to extend through 180°, as does the front face of the rib shown in Fig. 5, or it may be of less extent, as shown in Fig. 4. In a preferred construction the front face 61 of each rib extends through about 140°, making the rib somewhat less than half round in cross-sectional configuration. When we refer to the ribs being substantially semi-circular in cross section we mean to include shapes such as are shown in Figs. 4 and 5 of the drawings.

The two lips that occur on each rib adjoin the rearwardly facing edge portions of the front 60 and they project rearwardly therefrom. In a preferred form of the invention the lips are flat or, at least, present flat outer faces 65, and the ribs are so related to the front portion 60 that the faces 65 of the ribs adjoin the face 61 of portion 60 and project rearwardly from portion 60 with the faces 65 tangential to the face 61. With this relationship of parts, and when the face 61 extends through less than 180°, the faces 65 of the ribs extend not only rearwardly but they diverge. For example, when the face 61 extends through about 140° the angle between the ribs 62 is about 40°.

As a result of the diverging rib formation above described the lips of adjacent ribs define air passages 18ª which are of substantial extent laterally of the plane of the panel and which converge as they extend inwardly or rearwardly from the front of the panel.

In practice the length or extent of the ribs laterally of the plane of the panel may be varied, depending upon conditions to be encountered. In a typical situation the lips may project laterally or rearwardly distances greater than the rearward extent of the portion 60. For instance, as shown in Fig. 4, the ribs may be of about twice the lateral extent of the portion 60.

In carrying out the invention it is preferred that the rib construction above described is formed from a flat sheet of a suitable material such as metal. In the case illustrated in Fig. 4 the ribs, with their front portions 60 and lips 62, are formed in or from a sheet of material so that they are located rearward of the front surfaces 70 of the panel. In the case shown in Fig. 4 the foremost portions or crests 71 of the front portions 60 of the ribs coincide with the front face 70 of the panel and, as a result, the ribs and their rearwardly projecting lips, are all rearward of the face 70 of the panel.

Further, in carrying out the present invention the width of the air passages 18ª may be varied relative to the width of the ribs to vary the action of the structure. In a preferred embodiment of the invention the mean width of the converging air passage defined by the lips 62 is about equal to the maximum width of the front portion 60 of a rib, this being the relationship illustrated, generally, in Fig. 4 of the drawings.

The form of the invention just described can be used to advantage where it is desired that the air passed by the panel be directed inwardly from the panel in a compact stream which flows laterally of the panel. The converging air passages 18ª established by the construction just described are effective in directing the air that is passed by the panel, with the result that it flows inwardly from the panel in a direction at right angles to its direction of flow before entering the panel. This form of the invention, like that shown in Fig. 5, is effective in excluding foreign matter from the air passed by the structure, its action in this regard being substantially the same as that of the structure shown in Fig. 5.

From the foregoing description it will be apparent that either form of the structure provided by the present invention when incorporated in a typical locomotive, such as is shown in Fig. 1, does not, in any way, encumber or interfere with the appearance of the vehicle and it need not protrude from the side or skin of the vehicle to be in any way objectionable. Further, it is to be observed that the panel as provided by the present invention is exceedingly simple in construction or formation and it will be observed that the shaping or formation of the ribs as taught by the present invention not only effectively handles foreign matter in the manner indicated above but stiffens the structure so that it is firm and durable. The desired action or separation of air and foreign matter occurs when there is relative movement between the body of air and the separator, whether by moving the separator through the air or by moving the air relative to the separator.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A substantially flat unitary separator panel with an exposed wholly unobstructed front side and adapted to be arranged with air flowing across its front side in a direction parallel with the plane of said front side, the panel having a plurality of spaced parallel like ribs within its margins extending transverse of the direction of said air flow, each rib having an arcuate portion substantially semi-circular in cross-sectional configuration with its convex side facing the same as said front side of the panel, there being air passages through the panel between the ribs, the width of each passage in a direction transverse of the ribs and parallel with the plane of the panel being substantially equal to the width of each rib in said direction transverse of the ribs.

2. A substantially flat separator applicable to a substantially flat wall to be the outermost part thereof at an opening therethrough and substantially parallel therewith to be parallel with an air stream flowing parallel with the wall including, a unitary flat sheet metal panel with an unobstructed front face and occupying the opening and disposed parallel with the wall, the panel having a plurality of like parallel spaced ribs inward of its margins and each having a concavo-convex portion substantially semi-circular in cross-sectional configuration with its edges in the plane of the front face of the panel and its crest forward of the plane of the front face of the panel, there being spaces between the ribs, the width of each space in a direction transverse of the ribs and parallel with the plane of the panel being substantially the same as the width of each of the ribs in the same transverse direction.

3. A substantially flat unitary separator panel with a wholly unobstructed front side and adapted to be arranged with air flowing across its front side and parallel with the plane of the panel, the panel having a plurality of spaced parallel like ribs within its margins extending transverse of the direction of said air flow, each rib having an arcuate portion substantially semi-circular in cross-sectional configuration with its convex side facing in the same direction as said front side of the panel and having lips projecting rearwardly from the edges of said portion, the lips of adjacent ribs approaching each other as they project rearwardly defining converging air passages between the ribs.

4. A substantially flat unitary separator panel with a wholly unobstructed front side and adapted to be arranged with air flowing across its front side parallel with the plane of the panel, the panel having a plurality of spaced parallel like ribs within its margins extending transverse of the direction of said air flow, each rib having an arcuate portion substantially semi-circular in cross-sectional configuration with its convex side facing in the same direction as said front side of the panel, and having diverging lips projecting rearwardly from the edges of said portion, the lips of adjacent ribs defining rearwardly converging air passages between the ribs, the mean distance between lips of adjacent ribs being substantially equal to the maximum width of the arcuate portions of the ribs.

5. A substantially flat unitary separator panel with a wholly unobstructed front side and adapted to be arranged with air flowing across its front side and parallel with the plane of the front face, the panel having a plurality of spaced parallel like ribs within its margins extending transverse of the direction of said air flow, each rib having an arcuate portion substantially semi-circular in cross-sectional configuration with its convex side facing the same as said front side of the panel, and having diverging lips projecting rearwardly from the edges of said portion, the lips of adjacent ribs defining rearwardly converging air passages between the ribs, the extent of the lips laterally of the panel being greater than the extent of the arcuate portions laterally of the panel.

6. A vehicle having a flat apertured wholly exposed wall extending longitudinally of the vehicle so there is flow of air across the aperture in the direction of the plane of the wall where the vehicle is in operation, a wholly unobstructed panel mounted rigid in the aperture so that it is parallel with the wall and is wholly exposed at the exterior of the wall, the panel having like fixed parallel spaced ribs extending transverse of the flow of air, the ribs having portions concavo-convex in cross section with their crests in a plane substantially coincidental with the plane of the wall, there being spaces between the ribs, the width of each space in a direction transverse of the ribs and parallel with the panel being substantially equal to the width of each of the ribs in the same transverse direction.

7. A vehicle having a wholly exposed flat vertical side wall extending longitudinally of the vehicle and having an opening extending laterally therethrough, a unitary sheet metal panel with a wholly exposed flat front face and occupying the opening and disposed parallel with the wall, the panel having a plurality of like parallel ribs spaced apart and extending vertically, the ribs having portions concavo-convex in cross-sectional configuration and disposed with their convex sides faced in the same direction as the front face of the panel and having flat diverging lips projecting rearwardly of the front face of the panel, there being spaces between the ribs to freely pass air and of substantially the same width as the ribs.

8. A substantially flat unitary separator panel with a wholly unobstructed front side and adapted to be arranged with air flowing across its front side and parallel with the plane of the panel, the panel having a plurality of spaced parallel like ribs within its margins extending transverse of the direction of said air flow, each rib having an arcuate portion substantially semi-circular in cross-sectional configuration with its convex side facing the same as said front side of the panel and having lips projecting rearwardly from the edges of said portion, the lips of adjacent ribs defining air passages between the ribs, the arcuate portion extending through substantially 140° and the lips having flat faces tangential to the convex side of the arcuate portion.

UNITED STATES PATENTS

References Cited in the file of this patent

| | | |
|---|---|---|
| 680,657 | Hart | Aug. 13, 1901 |
| 748,669 | Valentine | Jan. 5, 1904 |
| 1,098,329 | Mead | May 26, 1914 |
| 1,673,906 | Fager | June 19, 1928 |
| 1,733,770 | Andrake | Oct. 29, 1929 |
| 1,865,677 | Cheyney | July 5, 1932 |
| 2,091,621 | Anderson | Aug. 31, 1937 |
| 2,123,838 | Baade | July 12, 1938 |
| 2,144,528 | Ewald | Jan. 17, 1939 |

FOREIGN PATENTS

| | | |
|---|---|---|
| 57,934 | Denmark | Sept. 2, 1940 |